Figure 4A:
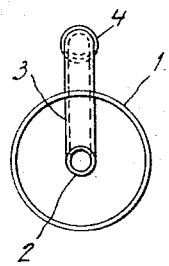

April 18, 1967     A. PERANIO     3,314,290
SHUNT FLOW METER
Original Filed July 11, 1962     2 Sheets-Sheet 1
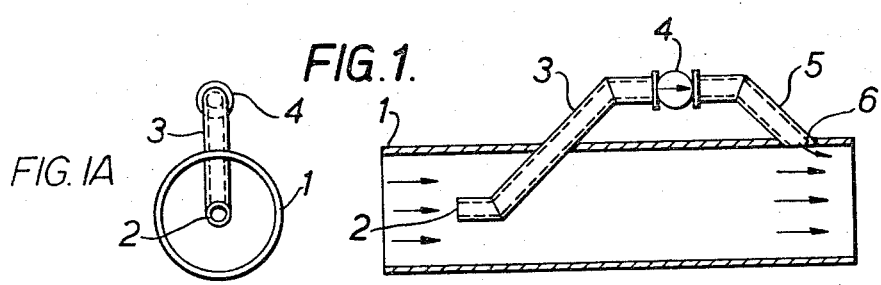
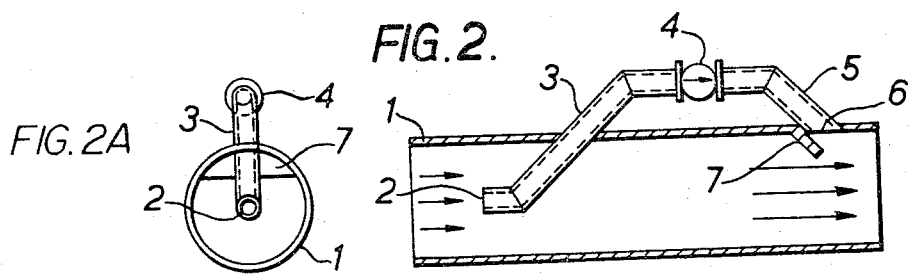
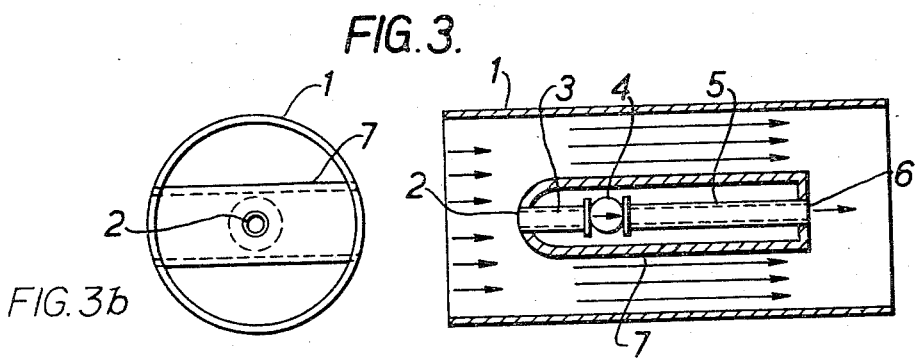
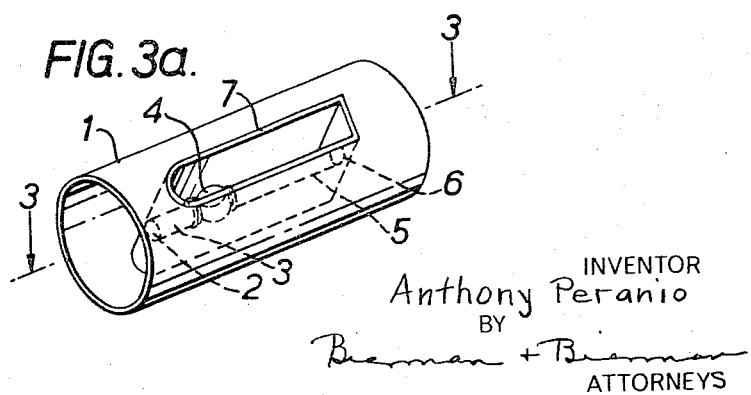
INVENTOR
Anthony Peranio
BY
Berman + Berman
ATTORNEYS April 18, 1967  A. PERANIO  3,314,290
SHUNT FLOW METER Original Filed July 11, 1962  2 Sheets-Sheet 2

INVENTOR.
ANTHONY PERANIO
BY
Bierman + Bierman
ATTORNEYS 3,314,290
SHUNT FLOW METER
Anthony Peranio, Haifa, Israel, assignor to The Technion Research & Development Foundation, Ltd., a corporation of Israel
Continuation of abandoned application Ser. No. 209,137, July 11, 1962. This application July 26, 1965, Ser. No. 474,864
8 Claims. (Cl. 73—202)

The present application is a continuation of pending application Ser. No. 209,137 filed July 11, 1962, and now abandoned.

This invention relates to an improved shunt, or by-pass, flow meter for measuring volumes or quantities of fluids (liquids, gases, or vapors) flowing in conduits.

There exists at present a multitude of devices for flow metering. One class includes the shunts, or so-called by-pass meter. This class is particularly important when fluid flow is to be measured in large conduits or pipes. Flow meters of large size are, relatively speaking, expensive items of equipment. In addition to the cost factor, cases exist for very large pipes in which no standard meter is available to fit the pipe line. For example, ready-made mechanical water meters exist for 12″ pipe lines, but no standard meter is available for a line 108″ in diameter.

The shunt meter principle is based upon measurement of a portion of the total flow in a conduit. Part of the main flow is diverted through a relatively small flow meter (usually a commercially available meter of the mechanical type) that registers or otherwise measures the quantity of by-passed fluid. The total flow is then inferred from the by-passed quantity. This method has two main advantages: first, the initial capital outlay for a shunt meter installation is only a fraction of the cost of the direct metering type; second, the shunt meter installation is less costly in maintenance.

Search of the literature in hydraulics, on the subject of shunt flow meters shows that these meters are divided into two main types: The venturi and the orifice plate type shunt meter.

Both these types are illustrated and described in "Flow Measurement and Meters" by A. Linford, published by Spon Ltd., London, in 1949. The essential parts of these meters are: a conduit in which the fluid to be measured is flowing, a restriction in this conduit (a venturi section, or an orifice plate), by-pass piping (and shut-off valves, if used), and a meter connected in the by-pass line to register the flow. In each type, the by-pass line inlet connection is upstream from the flow construction element, and the by-pass inlet and outlet conduits are connected at right angles, or substantially so, to the main conduit. These abrupt changes in flow direction for the portion of the fluid that is by-passed cause a large head loss. In addition, an asymmetrical flow condition is created since by-pass flow is taken off and returned over a small portion of the perimeter of the main conduit at the inlet and outlet of the by-pass line. After flowing through the by-pass meter, the shunted fluid is then re-introduced into the stream of fluid flowing in the main conduit just after, or at the restricted section.

The invention described in this specification will, all other things being equal, provide a greater driving head for the by-pass meter, and less head loss across the entire meter than other previously used by-pass meters. In addition, this new by-pass meter is, in certain of its forms, less sensitive to velocity profile variations across the main conduit section since it imposes an essentially symmetrical flow condition in the main conduit.

In addition, according to the invention, there are fewer abrupt changes in flow direction in the by-pass line, and since whenever possible a propeller or turbine type flow meter is used as the by-pass flow metering element, the devices described in this specification are less subject to clogging by sedimentation and other foreign material than the by-pass meters used heretofore.

Embodiments of the present invention are illustrated, by way of example only, for use in the flow measurement of a liquid, say water, flowing in a pipeline of circular cross section.

The accompanying drawings show:

FIGS. 1 and 1A, an end and front view (in section) of a by-pass meter having an upstream impact head producing conduit.

FIGS. 2 and 2A, an end and front view (in section) of a by-pass meter having an upstream impact head producing conduit in addition to a pressure differential producing device.

FIGS. 3 and 3B, an end and front view (in section) of a by-pass meter having an upstream impact head producing conduit and a hollow axially located pressure differential producing device.

FIG. 3A is a perspective view of the embodiment shown in FIGS. 3 and 3B.

Figure 4:
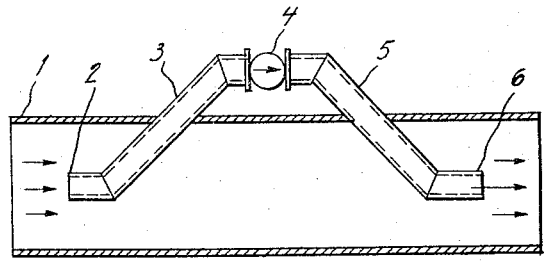

FIGS. 4 and 4A, an end and front view (in section) of a by-pass meter having both upstream and downstream impact head producing conduits.

Figure 5A:
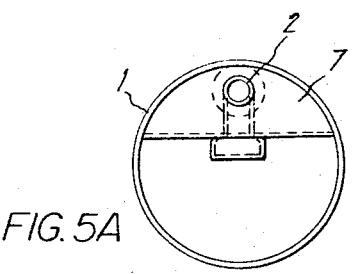
Figure 5:
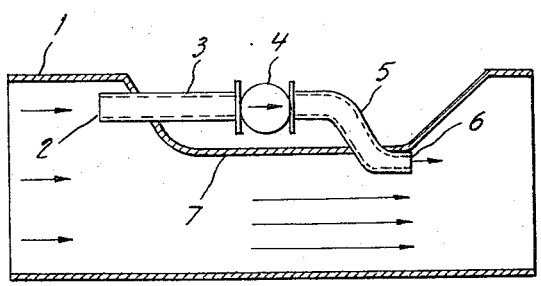

FIGS. 5 and 5A, an end and front view (in section) of a by-pass meter having both upstream and downstream impact head producing conduits in conjunction with a pressure differential producing device.

Figure 6A:
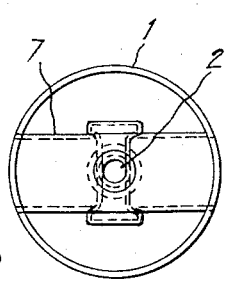
Figure 6:
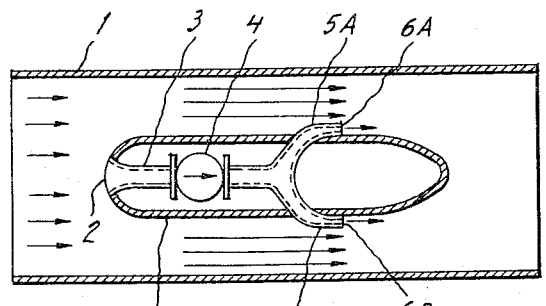

FIGS. 6 and 6A, an end and front view (in section) of a by-pass meter having both upstream and downstream impact head producing conduits in conjunction with a hollow axially located pressure differential producing device.

Shown in the various figures is 1, a section of relatively large fluid carrying conduit. The examples given concern a circular conduit, but in practice, the conduit may be a square, rectangular, trapezoidal, or any other desirable cross sectional shape. Passing through the wall of the large conduit is the upstream impact head producing conduit 3. The impact head is due to the abrupt change in velocity of the fluid flowing; a higher velocity exists in the free stream just ahead of the impact opening 2 than exists in conduit 3. With fluid flowing through the large conduit, the pressure at opening 2 is higher than the pressure throughout the free stream. Conduit 3 carries the by-passed fluid into a flow metering element 4. This flow metering element could be any one of a large number of types, depending upon the fluid flowing. If, as in this example, the fluid is water, the flow metering element may be a propeller type, turbine type, multiple jet turbine type, paddle wheel type, and in general, any type of flow meter having a head loss of under approximately one atmosphere at the maximum flow rate for which the meter was designed.

During passage through the meter 4 water actuates the hydraulic element of the meter and the integrating mechanism (usually a gear train with indicating dials) of the meter, registers the volume of water that has passed in the shunt line. The quantity of water that passed in the main conduit can be inferred from the reading of the small by-pass meter since a definite relationship exists between the rate of flow in the by-pass line and the rate of flow in the large pipe to within certain limits of error; about ±2% over the useable flow range of the by-pass meter.

In the case of low pressure air, the flow metering element may be a simple anemometer or a propeller type meter arranged in a shunt duct. In the case of vapors such as steam, flow metering elements commonly used include the turbine or propeller type made of materials capable of withstanding high temperature service.

In FIG. 1, a discharge conduit 5 is connected to the outlet of the flow metering element. This conduit passes through and terminates in the wall of conduit 1. The by-passed fluid rejoins the main stream of fluid through discharge outlet 6. In FIG. 1, the driving head producing the by-pass flow is the impact head produced at opening 2, plus the head loss caused by the friction opposing flow of that portion of conduit 3 inside of conduit 1, and the friction opposing flow of the large conduit 1 between impact opening 2 and discharge opening 6; both these head losses creating a differential head that adds to the impact head.

The opposing head (and this is true for all the cases shown) is composed of: the loss caused by the bypassed fluid as it enters impact opening 2; friction losses when the by-passed fluid passes through conduit 3; losses caused when the by-passed fluid flows through the flow metering element 4; friction losses when the by-passed fluid passes through conduit 5; and, exit losses caused when the by-passed fluid discharges back into the main stream through opening 6. For any given main flow rate, a point of equilibrium is reached whereby the total driving head derived from the sources mentioned above just equals the head loss of all the elements in the by-pass line, from intake to outlet.

It should be noted that there may be an impact head produced at opening 6, but this depends upon the angle at which the by-passed fluid stream enters the main stream. If the streams meet at right angles no impact head is produced. In general, unless special care is taken to create an impact head at 6 (see FIGS. 4, 5 and 6) any impact head generated is of minor consequence.

In FIG. 2 a restriction 7 has been added to an arrangement otherwise similar to that shown in FIG. 1. In this case, the restriction takes the form of a simple segmental orifice plate. This orifice causes the free stream velocity to increase as it passes the restriction and, according to Bernoulli's Law, the pressure is reduced below that of the free stream. Thus, in addition to the driving head obtained in the arrangement depicted in FIG. 1, there is an additional differential head produced by the restriction. This additional driving head is obtained at the expense of slightly greater head losses for the entire by-pass meter considered as a unit.

Alternatively, the restriction 7 of FIG. 2 may be replaced by a conventional venturi or flow nozzle. In any case, the discharge opening 6 should be located so that it is at the section of substantially lowest pressure. In FIG. 3, the differential pressure producing device 7 consists of a hollow body placed axially and symmetrically inside the main conduit. It passes through, from wall to wall of the main conduit so as to form a hollow enclosure into which is placed the entire by-pass meter and its conduits. As in the other types, the impact heads are enerated at the upstream opening 2 and the downstream opening 6. (Impact head at 2 is always positive, adding to the driving head; impact head at 6 may be positive or negative, depending upon flow conditions.) Due to the stream restriction caused by body 7 the free stream pressure around impact opening 6 is less than that around impact opening 2. This differential head, adding to the total impact head produced constitutes the driving head necessary for causing flow through the axially located, by-pass line.

In FIG. 4, the driving head is composed mainly of the impact heads developed at openings 2 and 6. In this case, the plane of opening 6 is axially located, and it faces directly downstream; thus an impact head is developed that aids the driving head. Note that the portions of impact conduits 3 and 5 located inside the main conduit 1 also constitute a restriction, and this restriction causes a differential pressure between the openings 2 and due to friction head loss, and decrease in head at opening 6 due to an increase in local velocity caused by the restrictive effect of conduit 5. In the event that the dimensions of conduits 3 and 5 are small relative to the dimensions of main conduit 1, then the impact head constitutes the major portion of the driving head; all other effects being relatively small ones. However, to show what happens otherwise, assume that conduits 3 and 5 are large relative to conduit 1; say the cross sectional area of the impact conduits are one-half that of the large conduit. It is clear that these so-called "impact" conduits are now in themselves a serious restriction to fluid flow. As such a driving head will be developed composed mainly of a large differential head caused by the friction and restrictive effect, and a relatively small impact head. (This analysis holds for all the variations presented in this specification.) However, whatever the ratio of cross sectional areas, the device will operate as an impact-restriction shunt flow meter.

In FIG. 5, a constriction device has been added to the double impact arrangement shown in FIG. 4. However, the driving head produced is greater than the sum of the head produced by the double impact arrangement alone and the construction alone. This multiplying effect is derived from the fact that impact opening 6 is connected into the region of lowest pressure (which gives a large difference in pressure between the intake and discharge openings of the by-pass line) and at the same time, this is the region of highest velocity (which makes the impact head developed at 6 greater than it would be if the by-passed fluid were allowed simply to discharge into the main stream at a point of lower velocity). In the example shown in FIG. 5, the differential head is produced by an asymmetric Venturi-like section. Alternatively, the differential head may also be produced by simply adding a flat plate to conduit 5 just at opening 6 forming an annular flow section for the fluid flowing in conduit 1. Flow through this restricted annulus causes the desired differential head. In every case, fluid flowing out of impact opening 6 is arranged so that it flows into the region of highest velocity caused by the restriction.

Finally, in FIG. 6, as in FIG. 3, the differential head producing device 7 consists of hollow body placed axially and symmetrically inside the main conduit. In FIG. 6 the stream restricting device is a fully streamlined body offering small resistance to flow. To aid in upsteam impact head development, the opening at 2 is made in a bell mouth shape, tapering down to match the size of the flow metering element. To obtain a multiplying effect the by-passed fluid is discharged into the region of maximum velocity and lowest stream pressure at 6A and 6B, through the outlet impact conduits 5A and 5B. Note that discharge can be made through one or more conduits similar to 5A and 5B, symmetrically placed, or an annular opening extending completely around the periphery of the streamlined body at a section of maximum velocity and low head.

In contradistinction to conventional by-pass meters, the improved by-pass meters described above utilize both the differential head due to placing a restriction in the main conduit, and, the head produced by changes in momentum of the fluid flowing into the inlet and out of the outlet piping of the by-pass line. Further, in two modifications the flow is symmetrical at intake, outlet, and around a differential head producing device, making this by-pass meter design less sensitive to the shape of the velocity profile in the main conduit. In all types described, the by-pass line is short and of smooth configuration. This coupled with the use of a propeller or turbine type meter makes the entire device relatively insensitive to effects of sedimentation and other clogging. Finally, the devices described are inexpensive to manufacture, since they incorporate into their construction commercially available mechanical meters many times smaller in size and lower in cost than full sized flow meters.

What is claimed is:

1. An impact-restriction shunt flow meter for measuring the flow of a flowing fluid in a relatively large main conduit comprised of a smaller conduit for producing an impact head within said main conduit containing therein a mechanical flow meter capable of measuring the flow of fluid, said meter being outside of the flow in said main conduit, said smaller conduit passing out of and back into said main conduit at a sufficiently abrupt angle to cause a change in velocity of flow in said smaller conduit and having an impact head opening facing directly upstream within said main conduit whereby part of the fluid flowing in said main conduit is by-passed through said smaller conduit at a higher pressure than the flow in said main conduit, said smaller conduit being of substantially uniform cross section in its intake section from its impact head to the flow meter, and being of the same cross section on the discharge side of said flow meter and thereafter discharging into the main conduit downstream from the impact opening, said smaller conduit terminating at the point of discharge thereof into said main conduit, said main conduit being provided with a segmental orifice plate at the upstream end of said discharge point at about the same inclination as the discharge end of said smaller conduit.

2. An impact-restriction flow meter for measuring the flow of a fluid in a large main conduit comprising a hollow body axially in said main conduit and of uniform diameter, said body having an upstream end centrally located in said conduit and a central portion out of the main stream, and a downstream end within said conduit, a by-pass tube of uniform diameter within said body in communication with the ends thereof, a metering device in said central portion, and within said by-pass both the upstream and the downstream ends being substantially parallel to the flow of the mainstream in said conduit, said by-pass being of substantially uniform diameter throughout its length, the arrangement maintaining a higher pressure and lower fluid velocity at the upstream end and a lower pressure and higher fluid velocity at the downstream end.

3. An impact-restriction flow meter according to claim 2 in which said by-pass is within the central part of said body having upstream and downstream openings at the ends of said body, at least three of the sides of said body being in contact with said flow to permit said flow to pass over at least the major area of said body.

4. An impact-restriction flow meter according to claim 3 in which said body is stream-lined.

5. An impact-restriction flow meter according to claim 3 in which said body has a bell mouth opening at the upstream end.

6. An impact-restriction flow meter according to claim 3 in which said body has the downstream end of said by-pass extending thru side of the body wall.

7. An impact-restriction flow meter according to claim 3 in which said body has the downstream end of said by-pass divided into a plurality of sections, the latter extending through the body wall.

8. An impact-restriction flow meter according to claim 2 in which said body extends to the wall of said main conduit to provide an opening giving access to said metering device.

References Cited by the Examiner

UNITED STATES PATENTS

| | | | |
|---|---|---|---|
| 535,639 | 3/1895 | Thomson | 73—202 |
| 749,645 | 1/1904 | Tuttle | 73—202 |
| 790,888 | 5/1905 | Ferris | 73—202 |
| 3,084,545 | 4/1963 | Waugh | 73—231 |

FOREIGN PATENTS

| | | |
|---|---|---|
| 537,572 | 3/1922 | France. |
| 600,609 | 11/1925 | France. |
| 285,984 | 2/1928 | Great Britain. |
| 508,511 | 6/1927 | Germany. |

RICHARD C. QUEISSER, *Primary Examiner.*

E. D. GILHOOLY, *Assistant Examiner.*